UNITED STATES PATENT OFFICE.

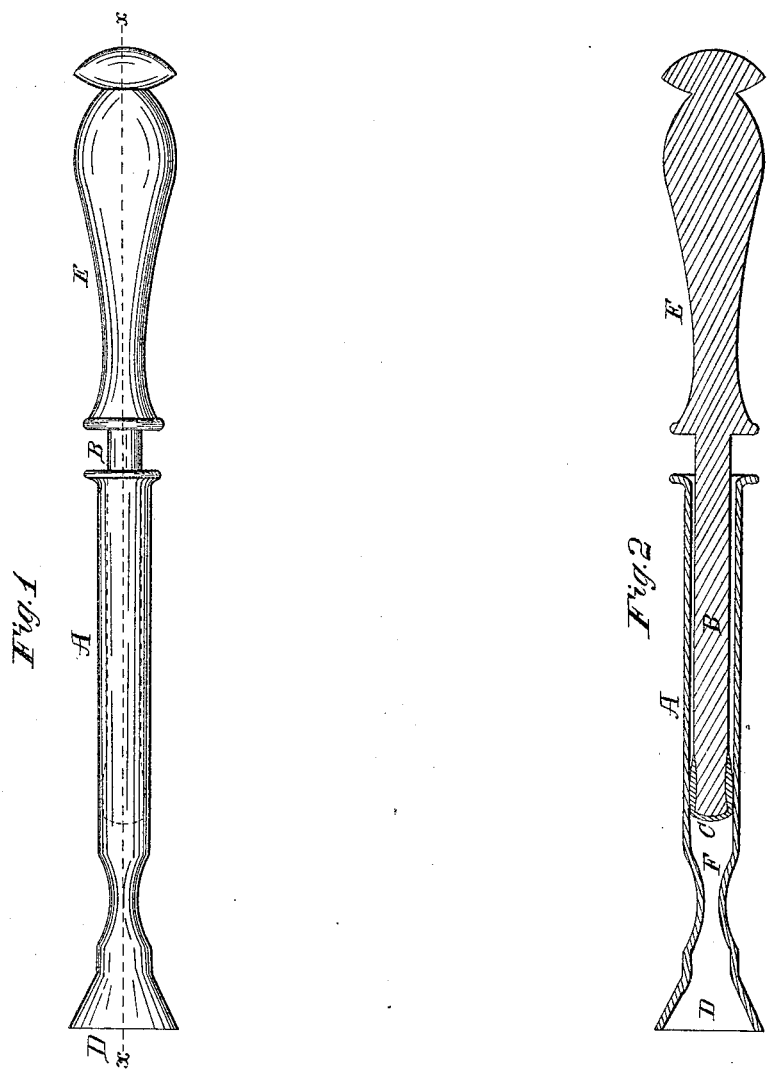

DANIEL PARISH, OF NEW YORK, N. Y.

INSTRUMENT FOR MODIFYING FOCAL LENGTH OF THE EYE.

Specification of Letters Patent No. 13,953, dated December 18, 1855.

*To all whom it may concern:*

Be it known that I, DANIEL PARISH, of the city and county of New York, in the State of New York, have invented certain new and useful improvements in optical instruments for restoring sight to the eye when the cornea, aqueous humor, and structure of the eye has become flattened by age or otherwise, and also for depressing the same when too full or convex; and I do hereby declare that the following is a full and exact description of the construction and operation of the same reference being had to the annexed drawing, and the letters of reference marked thereon, making part of the specification.

Figure 1, is a view of the instrument; Fig. 2, a longitudinal section of the line in Fig. 1.

A Fig. 1, is the cylinder or tube tapering at one end and full and regular at the other. Inside of this tube is the piston $c$, attached to the piston rod B, E, in Fig. 1, by which the piston can be moved up and down the cylinder air tight; F, the hollow or empty space, in Fig. 2, inside the tube, in which the piston moves; D, the orifice in the shape of a bell, which is to be placed over the eye air tight and into which the eye is forced on drawing back the piston.

By applying the open end of the tube closely over the eye with the piston down, and then drawing back the piston a vacuum will be produced between the eye and the piston in the empty space or chamber F. Consequently the eye by the pressure of the external atmosphere will be crowded into the orifice and assume more than its ordinary convexity, while subject to the shape and action of the instrument.

When the instrument is being used or while the piston is being drawn down, the instrument should be pressed closely over the eye, and by a repeated use of the instrument the structure of the eye will gradually become more and more convex, until it has returned to its original form necessary to perfect vision.

When the structure of the eye is by nature formed too convex, which is the case with near sighted persons the reverse of the foregoing practice should be adopted in the use of the instrument, viz: the piston should be drawn down the chamber before the instrument is applied to the eye; and when the instrument is applied as above, the piston should be moved up the chamber toward the eye, by which the structure of the eye will be depressed by force of the internal atmosphere, so that by repeating this process this too great convexity of that organ will gradually become sufficiently flattened for the purpose of correct vision.

The patient should apply the instrument to the eye, as above directed, every evening before retiring to rest for the space of twelve minutes. This should be practiced upon one and the same eye for one week, and then changed to the other eye for the same period, and so on alternately from one eye to the other for the term of three months, when in ordinary cases the eye will be restored to the perfection of vision. In the case of persons greatly advanced in years, and have been long in the habit of using spectacles, a longer time would be necessary.

The instrument consists of a glass cylinder of which the annexed drawing is a fair resemblance, a piston of cork covered with silk and which is attached to a piston rod and handle of mahogany, for all of which reference may be had to the annexed drawing. The occasion of imperfect vision, in near sighted persons, is a too great convexity in the structure of the eye, to remedy which heretofore, concave glasses have been used, which can be cured only by flattening the structure of the eye; in long sight, the eye has become flattened by age and bad use of the eyes, the remedy of which has been by the use of convex glasses. Now if the eye can be preserved from becoming too flat, or restored to a proper convexity after being depressed, it follows that the preservation in the one case and the restoration in the other, would result in the disuse of spectacles. The use of this instrument will affect both of these objects.

What I claim to be new, and for which I desire a patent is—

The improved optical instrument herein described for the purpose of improving and restoring the sight, by giving greater convexity to the eye when flattened, and also by depressing that organ when too convex in the manner herein specified.

DANIEL PARISH.

Witnesses:
CAROLINE PHILIPS,
L. PITKIN.